United States Patent
Benz

(10) Patent No.: US 11,490,999 B2
(45) Date of Patent: Nov. 8, 2022

(54) LIGHT CURING DEVICE FOR DENTAL RESTORATION MATERIALS AND METHOD OF CURING DENTAL RESTORATION MATERIALS

(71) Applicant: Ivoclar Vivadent AG, Schaan (LI)

(72) Inventor: Oliver Benz, Gamprin (LI)

(73) Assignee: Ivoclar Vivadent AG, Schaan (LI)

( * ) Notice: Subject to any disclaimer, the term of this patent is extended or adjusted under 35 U.S.C. 154(b) by 164 days.

(21) Appl. No.: 16/013,213

(22) Filed: Jun. 20, 2018

(65) Prior Publication Data

US 2018/0296310 A1   Oct. 18, 2018

Related U.S. Application Data

(63) Continuation-in-part of application No. 14/421,199, filed as application No. PCT/EP2014/065775 on Jul. 23, 2014, now abandoned.

(30) Foreign Application Priority Data

Jul. 23, 2013 (EP) ..................................... 13177641

(51) Int. Cl.
*A61C 13/15* (2006.01)
*A61C 1/00* (2006.01)

(52) U.S. Cl.
CPC .......... *A61C 19/004* (2013.01); *A61C 1/0015* (2013.01)

(58) Field of Classification Search
CPC .... A61C 19/003; A61C 19/004; A61C 1/0015
See application file for complete search history.

(56) References Cited

U.S. PATENT DOCUMENTS

| | | | |
|---|---|---|---|
| 5,912,470 A * | 6/1999 | Eibofner | B29C 35/08 250/492.1 |
| 6,008,264 A | 12/1999 | Ostler et al. | |
| 6,103,203 A * | 8/2000 | Fischer | A61C 19/004 422/129 |
| 6,159,005 A * | 12/2000 | Herold | A61C 19/004 433/29 |
| 6,482,004 B1 * | 11/2002 | Senn | A61C 19/004 433/29 |
| 6,602,074 B1 | 8/2003 | Suh et al. | |
| 7,104,793 B2 * | 9/2006 | Senn | A61C 19/004 362/373 |
| 8,106,600 B1 | 1/2012 | Fregoso | |
| 9,072,572 B2 | 7/2015 | Gill et al. | |
| 10,231,810 B2 * | 3/2019 | Gramann | A61B 1/247 |
| 2003/0091955 A1 * | 5/2003 | Burtscher | A61C 19/004 433/29 |

(Continued)

*Primary Examiner* — Jacqueline T Johanas
*Assistant Examiner* — Shannel Nicole Belk
(74) *Attorney, Agent, or Firm* — Ann M. Knab; Thad McMurray

(57) ABSTRACT

The invention is directed to a light curing device, in particular for dental restoration materials, having a light source and a control device for the light curing device, which control device is capable of switching on the light source at different levels of power. The light curing device includes an actuation element which can be used to switch on the light curing device upon actuation by the user at a reduced dosage of light for pre-curing the dental restoration material. The control device in particular signalizes the reduced dosage.

17 Claims, 2 Drawing Sheets

(56) References Cited

U.S. PATENT DOCUMENTS

| | | | |
|---|---|---|---|
| 2004/0005524 A1 | 1/2004 | Oxman et al. | |
| 2007/0259309 A1 | 11/2007 | West et al. | |
| 2010/0140450 A1* | 6/2010 | Duret | A61C 19/004 250/205 |
| 2010/0273123 A1* | 10/2010 | Mecher | A61C 19/004 433/29 |
| 2012/0156637 A1* | 6/2012 | Benz | A61C 1/0046 433/29 |
| 2014/0038124 A1* | 2/2014 | Gill | H05B 45/37 433/29 |
| 2016/0008115 A1* | 1/2016 | Senn | A61C 1/0015 433/27 |

\* cited by examiner

LIGHT CURING DEVICE FOR DENTAL RESTORATION MATERIALS AND METHOD OF CURING DENTAL RESTORATION MATERIALS

CROSS-REFERENCE TO RELATED APPLICATIONS

This application is a continuation-in-part of U.S. application Ser. No. 14/421,199, filed on Feb. 12, 2015, which is the National Stage application of International patent application PCT/EP2014/065775 filed on Jul. 23, 2014, which claims priority to European patent application No. 13177641.1 filed on Jul. 23, 2013, all the disclosures of which are incorporated herein by reference in their entirety.

FIELD OF THE INVENTION

The invention relates to a light curing device for dental restoration materials.

BACKGROUND

Light curing devices are typically operated at predefined exposure times during which times a polymerization of the dental materials to be polymerized takes place.

The exposure time has typically been considered as being decisive in order to ensure that the dental material which has previously been applied to or inserted into the restoration site has been cured sufficiently without becoming brittle.

Polymerizable dental materials can be cured both by light and by heat and by combinations thereof. In the development of dental materials of this type it has been strived to ensure that the material is cured as uniformly as possible. In trying to achieve this homogenization, they have also accepted longer curing times which actually did not produce bad results at the beginning of the nineties using halogen lamps which were used frequently at that time; however, they required uncomfortably long treatment periods for patients.

In order to achieve a better control of a full curing but also to minimize strain on the patient, pre-curing processes were developed at the end of the nineties as can, for instance, be seen from EP 1 046 381 A1. Pre-curing processes of this type made it possible to reduce the main curing time. Surprisingly, in some cases it was not possible to reduce the main curing time without the risk of an incomplete curing. On the other hand, an incomplete curing process evokes the danger that free radicals are present whose carcinogenic effect cannot be excluded at present.

It is known that light-curable dental materials such as polymethyl methacrylate tend to reduce their volume in light curing, i.e. to shrink—albeit to a slight extent. In order to prevent marginal gaps from occurring due to the shrinkage of dental material, attempts have been made to counteract the shrinkage to that effect that initially the deep layers of the dental material are cured, then the subsequent layers and eventually the top layers.

Curing of this type is, however, only possible by curing the dental materials layer by layer, which is correspondingly time-consuming and labor-intensive.

Furthermore, it has already been suggested to provide light curing devices with a predefined performance sequence, for instance switching on the light curing device at reduced power, subsequently a period of time without power and then a period of time at full power. This solution was to reduce the formation of edge gaps. However, this solution is only suitable for dental restorations of relatively small depth because light curing at reduced power cures basically primarily the surface of the dental restoration while the output of light at high power also penetrates deeper layers of the dental restoration. In this respect, a predefined sequence of this type has a rather unfavorable effect.

In the 2000s, the luminous power of LED chips increased significantly, and in particular light-emitting diodes were developed, the emission peak of which corresponded to, or which deviated at least only to a small degree from, the spectral sensitivity peak of camphorquinone, the preferred photo initiator for PMMA. This allowed for a considerable reduction of the time necessary for one polymerization cycle. Due to the increasing power, overcuring became more critical at the same time such that the producers of dental devices have started to predefine fixed periods for the polymerization process, i.e. for instance 5, 10 or 15 seconds, with the proviso that corresponding adjustments are made depending on the size of the dental restoration.

Contrary to this, the invention is based on the task of providing a light curing device for dental restoration materials which makes possible to improve adjustment possibilities, in particular with large and deep dental restorations.

SUMMARY OF THE INVENTION

According to the invention, it is particularly favorable that the new light curing device makes possible to control a reduced dosage of light at user's option. Surprisingly, by controlling the dosage a considerably improved control over the degree of pre-curing is achieved than is the case with a mere power control—or a mere time control. This enables the dentist—or possibly the dental technician—to make further adaptations to the dental restoration part after the part has initially been made slightly more viscous by the pre-curing process.

To a large degree, the adjustment of the dosage for the pre-curing process can be adapted to the requirements in advance. In this way, for instance a relatively short pre-curing time can be combined with relatively high pre-curing power if relatively large and deep dental restorations are to be pre-cured.

With the help of the adaptation, the hardness gradient along the depth of the dental restoration may be adapted to the requirements to a large extent.

According to the invention, it is preferred in this context if the hardness at the bottom of the dental restoration comprises 80% or more of the hardness at the surface. In this respect, with deep dental restorations a comparatively short pre-curing time—and a correspondingly high level of power—is preferably used, while flat dental restorations are preferably pre-cured using a longer pre-curing time and a correspondingly lower level of power, by way of contrast.

It is particularly favorable that the pre-curing cycle is independent of the main curing cycle. In this way, the user can initially perform the pre-curing process at any desired point in time chosen by the user. The pre-curing process can include reduced periods of time between 1 msec and 10 seconds, or 0.1 second to 1 second. In the case of several dental restorations to be processed, the dental restorations can be pre-cured one after the other and after having finished the pre-curing processes for all dental restorations the light curing device can be put down and a visual check can be made and any desired finishing processes or adaptations can be performed, if necessary. By pressing on the dental restorations again, the minimal shrinkages of the dental restoration material which occur during pre-curing can be compensated for easily.

The light curing device is configured as a hand-held device, and the control device switches on the light curing device when it is picked up by the hand of a user. When the light curing device is in pre-curing mode and the pre-curing mode has been finished, the light curing device assumes a standby-mode from which it can be switched to the regular curing mode upon actuation of the actuation element at a point in time selected by the user. The actuation element of the light curing device can include several buttons, which can be used to activate the desired mode, and a control button which can be used to adjust a mode or a program of the light curing device.

Afterwards a break of any desired length is made during which the dental restoration material can possibly cool. During this period of time, automatic checks can, for instance, also be made, for instance with the help of a digital camera which detects the pre-cured dental restoration and carries out an image recognition in order to enable refinishing work, if necessary.

At any desired point in time, the main curing time can follow, wherein it is preferred that the light curing device is then switched into a main curing mode. Preferably, the light curing device remains in the pre-curing mode—even if it has been put down temporarily and is in the non-operating state—until the user switches on the main curing mode explicitly with the help of a further actuation element or a renewed actuation of the actuation element for the pre-curing mode.

In an advantageous embodiment of the invention it is provided that the reduced dosage is signalized. This can happen in any desired manner, for instance by a change in light color, by a flashing of the light source, repeatedly switching on and off in the sense of a pulsed output of light for pre-curing or for instance with the help of an additional light-emitting diode which symbolizes the pre-curing mode.

In an advantageous development it is provided that the dental restoration material is applied in layers to form the finished dental restoration. This embodiment is particularly reasonable if the depth of the dental restoration amounts to more than 2 mm. Preferably, the first layer may then be applied with a layer thickness of, for instance, 1 mm and may be pre-cured.

The pre-curing process transfers the layer from a liquid aggregate phase into an aggregate phase of high-viscosity in which it is basically shape-retentive. After having visually checked the dental restoration, a renewed pressing on can possibly take place and the second layer can be applied. The highly viscous first layer is connected to the second layer in a particularly good manner. If necessary, a further pre-curing step is carried out in order to ensure ideal shape adjustment properties.

In the main curing process, the high power ensures that the deep layer is reached easily and is cured together with the top layer.

In a mode of increased power this through-curing process can also be achieved in which the light curing device has a power output of between 5 and 20 $W/cm^2$ and, in this respect, provides the dosage necessary for this through-curing process with the help of high power combined with a correspondingly reduced on-time.

In a further advantageous embodiment it is provided to select the inventively reduced dosage in such a way that it makes the dental restoration material viscous, in particular highly viscous. In this condition, the dental restoration material can be shaped easily, similar to modeling clay, such that it is considerably easier to impart the desired shape.

According to the invention, an intermediate modeling step is thus particularly favorable, such that the inventive sequence is as follows: pre-curing step—modeling step—main curing step. As a modification, any desired pre-curing steps may be combined with modeling steps in the case of several layers, and it is also possible to carry out the modeling of several subsequently pre-cured dental restorations in one go, i.e. as a combined modeling step, such that several adjacent dental restorations can be modeled in one go, i.e. without having to pick up a light curing device in the meantime.

In a further advantageous embodiment, the pre-curing mode is connected to an output of light of longer wave lengths, the spectral maximum of which can amount to, for instance, 520 nm. An output of light of this type can be differentiated optically from the blue light output in the main curing mode; however, enough energy is provided in the spectral sensitivity peak of camphorquinone (470 nm) in order to ensure the desired pre-curing process.

In yet another embodiment, the pre-curing mode is a prefixed mode having a specific dosage. The prefixed mode can have a pre-set or prefixed power and a pre-set or prefixed time that is set by the manufacturer and which cannot be changed by the purchaser or user.

It is preferable that the prefixed dosage has a power preselected from a power in the range of 5 $mW/cm^2$ to 1000 $mW/cm^2$ and has a time preselected from a time in the range of 1 msec to 10 seconds. This dosage range works most optimally at a distance of 0-5 mm.

It is more preferable that the prefixed dosage is preselected and fixed at a power of 950 $mW/cm^2$ and at a time of 2 seconds. This prefixed power and time is optimal for pre-curing a variety of composite dental materials.

Other preferable prefixed/preset combinations include a power of 350 $mW/cm^2$ and a time of 8 seconds, a power of 450 $mW/cm^2$ and a time of 7 seconds, a power of 550 $mW/cm^2$ and a time of 6 seconds, a power of 650 $mW/cm^2$ and a time of 5 seconds, a power of 750 $mW/cm^2$ and at a time of 4 seconds, a power of 850 $mW/cm^2$ and at a time of 3 seconds, a power of 900 $mW/cm^2$ and at a time of 2 seconds, and a power of 1000 $mW/cm^2$ and at a time of 1 second. These powers and times are not limited by the examples herein but may be any power and time within the stated ranges herein as long as the selected time and power is preselected and prefixed so that it can not be changed.

Other optional prefixed/preset ranges include 800-1000 $mW/cm^2$, 800-950 $mW/cm^2$, 850-1000 $mW/cm^2$, 850-950 $mW/cm^2$, 800-900 $mW/cm^2$, 900-1000 $mW/cm^2$, 950-1000 $mW/cm^2$, and time ranges of 1 to 5 seconds, 2 to 4 seconds and 2 to 3 seconds wherein a preselected power and time (preselected dosage) is prefixed into the device, such that the preselected dosage is the same every time the pre-curing mode is actuated.

The prefixed pre-curing mode can be set such that the prefixed pre-curing mode automatically comes on when the device is turned on or actuated.

It is preferable that the prefixed pre-curing mode has a separate actuation mechanism or button, although this is not necessary. With separate actuation, a user can press the mechanism as many times as necessary to actuate as many operations at the same dosage.

Setting a prefixed pre-curing mode prevents the user from completely curing the material prematurely. The prefixed pre-curing mode does not allow the user to change the pre-curing mode, ensuring only pre-curing when the pre-curing mode is actuated, and preventing full hardening before the dentist is ready to fully cure or before the material is fully shaped or fully prepared or finished.

BRIEF DESCRIPTION OF THE DRAWINGS

Further advantages, details and features may be taken from the following description of one exemplary embodiment in conjunction with the drawings.

DETAILED DESCRIPTION

Figure 1:
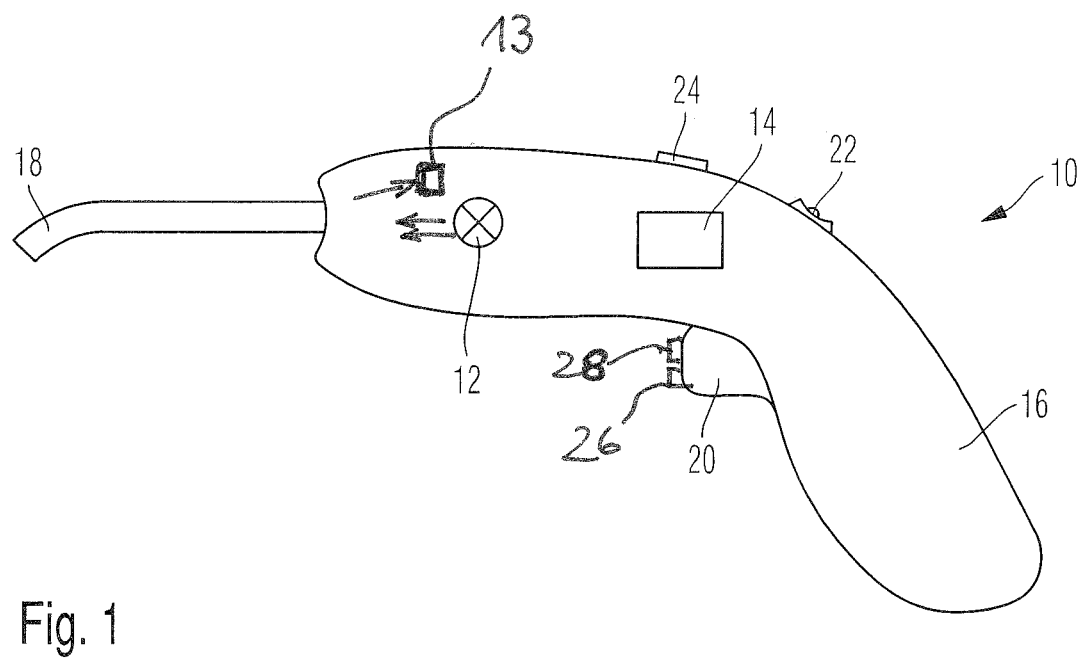
FIG. 1 shows an inventive light curing device in one embodiment.

The light curing device 10 illustrated in FIG. 1 comprises a light source 12, a sensor 13, and a control device 14 which are received in a pistol-shaped housing 16 in a way known per se.

A light-conducting rod 18 projects from the front side of the housing 16 of the light curing device 10 which light-conducting rod is cranked or bent in a way known per se at its distal end in order to allow for light exposure even from sites which are difficult to access.

The inventive light curing device comprises an actuation element 20 which has a dual function in the exemplary embodiment illustrated. Actuation element 20 includes button 26 which can be used to activate a desired curing mode, and a control button 28 which can be used to adjust a mode or a program of the light curing device (10). In this example it is located at a position at which the trigger of a pistol would be arranged. By pressing on and thus actuating the actuation element with the help of the user's index finger the light curing device is initially switched into a mode which is referred to as pre-curing mode in which light is output by the light source 12, and thus from the front end of the light-conducting rod 18 at a reduced dosage. Here, the term dosage refers to the product of power and time such that the output of light is carried out at a dosage which is reduced compared to the dosage of the regular curing mode.

If, for instance, in the regular curing mode the light source 12 is switched on at a power of 4 W for 10 seconds, in the pre-curing mode the output of light can, for instance, amount to 400 mW also for a period of time of 10 seconds, or—in the other extreme case—for only one second at 4 W, too. In both cases, the same reduced dosage is applied.

By actuating the actuation element 20 the light source 12 can be switched on. In the exemplary embodiment illustrated it is switched to the mode in which the light curing device is, based on information stored in the control device 14. For instance, it can be determined that the light curing device is in the pre-curing mode when the device is switched on for the first time. In that mode light is output from the light-conducting rod 18 at a reduced dosage when the actuation element 20 is actuated.

The output of light in the pre-curing mode can be signalized by flashing, a change in color or in any other desired manner, for instance via the signal LED 22 illustrated in FIG. 1 which signalizes the pre-curing mode.

In order to change to another mode the actuation element 20 is actuated in any desired other, but unusual manner. Here, it is possible, for instance, to introduce the change of mode by pressing the actuation element 20 for more than one second. Another possibility is to introduce the change of mode by a temporary dual actuation of the actuation element 20. The change of mode can also be signalized, for instance, by a corresponding confirmative flashing of the signal LED 22, or by a temporary confirmative light output by the light source 12.

In a modified embodiment it is provided to switch on the pre-curing mode via a separate on-button or any other separate on-function.

Preferably, the light curing device remains in the current mode even if the device is turned off and put down.

Alternatively, it is also possible to always select a specific mode, for instance the pre-curing mode, in a "cold start" of the light curing device such that as a rule pre-curing always takes place prior to the main curing step.

The light curing device illustrated in FIG. 1 also comprises a mode referred to as an increased power output mode which is started with the help of a flash button 24. In this mode which is only available in the main curing mode very high luminous power is used for a short period of time, for instance 10 or 12 W, but only for a very limited period of time such as 1 second or 1.5 seconds. It is favorable to release this mode only by pressing the flash button in order to prevent any possible health hazards caused by burns due to an unintentional start-up of the device in the increased power output mode.

It is also preferred to provide the flash button 24 with an actual push-button function such that the increased power output mode is only started if the flash button 24 is pressed down effectively when the actuation element 20 is actuated. In addition, this mode can also be signalized optically.

According to the invention, it is favorable if the on-times in the pre-curing mode and in the main curing mode are set independently of one another, or if they can be programmed independently of one another. If the exposure time settings in the regular curing mode are changed, this does not have to lead to a change of the exposure time in the pre-curing mode.

In an advantageous embodiment, it is provided to attach a sensor which is not illustrated herein in such a way that it is directed at the target area of the light source of the light-conducting rod 18. In this way, it can be checked if the light exposure of the dental restoration material is sufficient both in the main curing mode and in the pre-curing mode.

According to the invention, it is favorable if the light curing device is turned off between the pre-curing mode and the main curing mode and if in this respect a "modeling mode" is produced virtually.

Figure 2:
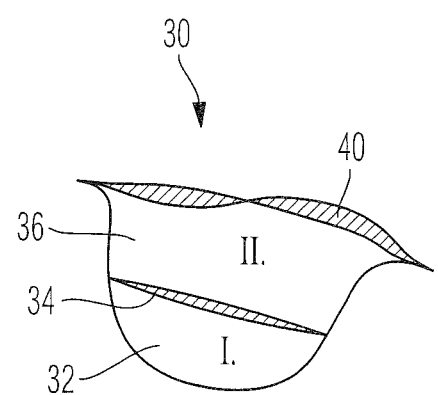
FIG. 2 shows a dental restoration in one embodiment.

FIG. 2 shows schematically how a dental restoration can be applied. Initially, a cavity 30 is filled with a first layer 32 of dental restoration material in a way known per se. In this condition, this layer is still fluid, although not highly fluid. The light curing device is turned on and the first layer 32 is thus converted from the fluid into a highly viscous state. At the same time, due to this process a slight reduction in volume 34 takes place which corresponds to a respective lowering of the layer level on its upper side. In this condition, the layer 32 is still easily deformable and slightly cohesive such that it easily adheres to a further layer II.

This second layer 36 is applied subsequently, wherein it combines well with the hardness layer 32 already during the application.

Subsequent to this step, the second layer is also subjected to a pre-curing mode. In this step, the second layer is also converted into a highly viscous state and binds itself more closely to the first layer 32 at the same time.

Subsequently, the light curing device is turned off or at least removed from the dental restoration material. The filling of the cavity 30 with the dental restoration material is checked visually and, if necessary, the dental restoration material is again pressed on with the help of a dental instrument suitable for this purpose. In this way, marginal gaps can be avoided reliably. Furthermore, it is possible to change the shape of the surface of the second layer, and this is symbolized by the hatched change in layer 40 according to FIG. 2. In this respect, this sleep mode can also be referred to as modeling mode.

In a further modified embodiment, it is provided to remove excess material without further ado instead of or in addition to the modeling step. This can be realized, for instance, with the help of a polishing rubber or a cutter. After the pre-curing process the material exhibits a certain hardness on its surface, while its hardness does not yet require any expensive machining in order to remove excess material.

It is to be understood that, if necessary, the material can be pressed on correspondingly and checked at least visually between the application of the first and the second layer.

In a modified embodiment only one layer is provided. Here too, subsequent to the application of the layer and to the pre-curing step in the pre-curing mode the material can be checked visually and, if necessary, pressed on and/or modeled according to the change in layer 40 of FIG. 2.

Figure 3:
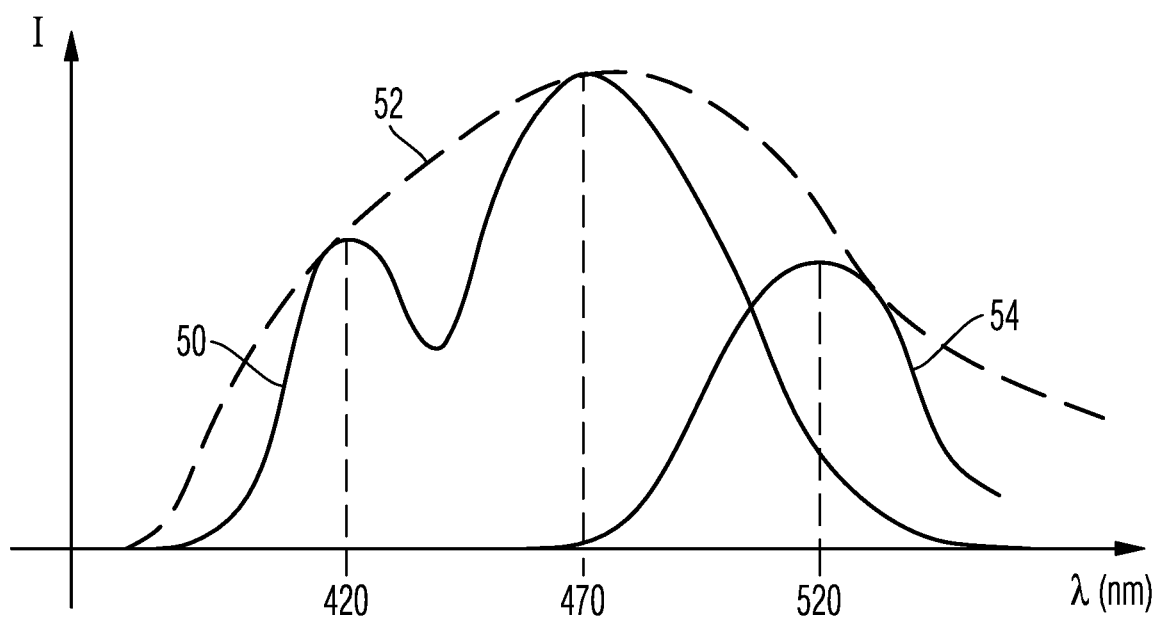
FIG. 3 shows a schematic illustration of the wave lengths used for the light curing device and the dental restoration according to the invention.

FIG. 3 shows how a change in mode can also be symbolized by a change in color of the light output of the light source 12. The light source 12 which comprises a plurality of LED chips being arranged substantially next to one another comprises its emission peak at a wave length of 470 nm for most chips. One chip comprises a maximum emission of 420 nm such that according to FIG. 3 the curve 50 showing the emission of the light source 12 in the regular mode is produced.

It overlaps the sensitivity curve 52 of champhorquinone significantly which is commonly used as a photo initiator for polymerizable dental material.

In the embodiment illustrated a further chip is provided which comprises an emission peak of 520 nm and whose emission spectrum corresponds to the curve 54 to that effect.

This chip can possibly be turned on solely for the pre-curing mode, or if necessary together with one of the chips whose emission peak is at 470 nm. In this way, the emitted light obtains a greenish hue, and thus the user of the light curing device receives a visual feedback on the switched-on state.

In a modified embodiment, it is provided that the pre-curing step is signalized by exclusively turning on a chip emitting a green-colored light. In this way it is possible to provide the pre-curing step by means of a light output of blue color at reduced power, possibly with an additional signal function such as flashing and the like, of blue color with a hint of green or of green color exclusively and to implement it at the same time.

It is to be understood that in addition to or instead of it further optical signals are possible, such as a flashing, an increase/reduction of the light output in the pre-curing mode or a turning on of the signal LED 22, or for instance an acoustic signal.

The invention claimed is:

1. A light curing device for dental restoration materials, comprising
a light source (12),
a control device (14) for the light curing device (10), and
an actuation element for actuation of a regular curing mode and a separate actuation element for actuation of a pre-curing mode,
wherein the pre-curing mode consists of a prefixed dosage consisting of a single prefixed power in the range of 800 mW/cm$^2$ to 1000 mW/cm$^2$ and a single prefixed time in the range of 1 msec to 10 seconds in order to prevent a material to fully harden,
wherein the pre-curing mode is set by a manufacturer and cannot be changed by a purchaser or user.

2. The light curing device for dental restoration materials as claimed in claim 1,
wherein the prefixed dosage consists of the single prefixed power at 950 mW/cm$^2$ and the single prefixed time of 2 seconds.

3. The light curing device for dental restoration materials as claimed in claim 1,
wherein the control device (14) is capable of switching on the light source (12) at different levels of power for the regular curing mode.

4. The light curing device for dental restoration materials as claimed in claim 1,
wherein the control device (14) signalizes the prefixed dosage.

5. The light curing device for dental restoration materials as claimed in claim 4,
wherein the signalizing comprises a change in color of the light source, a flashing of the light source, repeatedly switching on and off of the light source (12), a light-emitting diode, an acoustic signal, and/or an additional display which symbolizes the prefixed dosage.

6. The light curing device for dental restoration materials as claimed in claim 1,
wherein the regular curing mode comprises a dosage having a period of time which is greater in power and time than the prefixed dosage.

7. The light curing device for dental restoration materials as claimed in claim 1,
wherein the prefixed pre-curing mode can be switched on independently of the regular curing mode, and
wherein a break can be selected between the prefixed pre-curing mode and the regular curing mode at discretion of the user.

8. The light curing device for dental restoration materials as claimed in claim 1,
wherein the light curing device (10) returns to the mode that was previously used before the device was turned off, after the device has been switched back on.

9. The light curing device for dental restoration materials as claimed in claim 6,
wherein the separate actuation element for actuation of a pre-curing mode comprises a first button for activating the pre-curing mode and the actuation element for actuation of the regular curing mode comprises a second button for adjusting the regular curing mode.

10. The light curing device for dental restoration materials as claimed in claim 9,
wherein the light curing device is switched between the pre-curing mode and the regular curing mode by pressing the first button and the second button.

11. The light curing device for dental restoration materials as claimed in claim 6,
wherein the light curing device comprises at least two LED chips with different emission maxima, one of the LED chips comprises a longer wavelength of the emission maximum and can only be switched on exclusively in the regular curing mode of the light curing device (10).

12. The light curing device for dental restoration materials as claimed in claim 1, wherein the light curing device (10) comprises a sensor which is directed at the target area of the light source (12) and detects at least one physical parameter of the dental restoration material while it is being cured.

13. The light curing device for dental restoration materials as claimed in claim 12,
wherein the sensor of the light curing device which is directed at the target area of the light source (12) is connected to the control device (14) and switches off the light source (12) in the pre-curing mode and/or in the regular mode when the output signal of the sensor signalizes sufficient light exposure.

14. The light curing device for dental restoration materials as claimed in claim 1,
wherein the light curing device (10) is configured as a hand-held device,
wherein the control device (14) switches on the light curing device when it is picked up by the hand of a user, and
wherein upon first actuation of the separate actuation element for actuation of the pre-curing mode, the light curing device (10) is switched to the pre-curing mode at a pre-fixed dosage.

15. The light curing device for dental restoration materials as claimed in claim 1,
wherein when the pre-curing mode has been finished the light curing device (10) assumes a standby-mode from which it can be switched to the regular curing mode upon actuation of the actuation element (20) at a point in time selected by the user.

16. The light curing device for dental restoration materials as claimed in claim 1,
wherein the actuation element (20) comprises several buttons comprising a button which can be used to activate a desired mode, and a control button which can be used to adjust a mode or a program of the light curing device (10).

17. A method of curing dental restoration materials using a light curing device (10) comprising a light source (12), a control device (14) for the light curing device (10), and an actuation element for actuation of a regular curing mode and a separate actuation element for actuation of a pre-curing mode, wherein the pre-curing mode consists of a prefixed dosage consisting of a single prefixed power in the range of 800 mW/cm$^2$ to 950 mW/cm$^2$ at a single prefixed time in the range of 1 msec to 10 seconds, wherein the pre-curing mode is set by a manufacturer and cannot be changed by a purchaser or user,
said method comprising
switching on the actuation element to the prefixed dosage for a pre-curing mode in which the prefixed dosage of the single prefixed power and the single prefixed time for pre-curing is supplied to the dental restoration material to prevent full hardening of the dental restoration material,
examining and/or refinishing the dental restoration material, and
switching the light curing device (10) to the regular curing mode at an increased power and/or time to fully cure the dental restoration material.

\* \* \* \* \*